United States Patent [19]

Gouji et al.

[11] Patent Number: 4,735,984

[45] Date of Patent: Apr. 5, 1988

[54] COMPOSITION CONTAINING DISPERSED PIGMENT AND PREPARATION METHOD THEREOF

[75] Inventors: Harunori Gouji, Higashiosaka; Hisao Kato, Hirakata; Hiroyoshi Kataoka, Takatsuki, all of Japan

[73] Assignee: Nippon Paint Co., Ltd., Japan

[21] Appl. No.: 811,883

[22] Filed: Dec. 20, 1985

[30] Foreign Application Priority Data

Dec. 25, 1984 [JP] Japan .................. 59-278891

[51] Int. Cl.$^4$ .................. C08K 5/01; C08K 5/06; C08K 5/10; C08G 18/32
[52] U.S. Cl. .................. 524/315; 524/190; 524/361; 524/376; 524/502; 524/507; 524/589; 524/590; 528/68
[58] Field of Search .................. 524/190, 590, 589, 502, 524/507, 315, 361, 376; 528/68

[56] References Cited

U.S. PATENT DOCUMENTS

| | | | |
|---|---|---|---|
| 2,761,852 | 9/1956 | Lehmann et al. | 528/68 |
| 2,888,438 | 5/1959 | Katz | 528/68 |
| 3,210,302 | 10/1965 | Bowell et al. | 524/590 |
| 3,255,500 | 6/1966 | Engel et al. | 524/590 |
| 3,325,346 | 6/1967 | Osborg | 528/68 |
| 3,682,867 | 8/1972 | Shackelford et al. | 528/68 |
| 3,728,301 | 4/1973 | Spence et al. | 106/308 N |
| 4,048,106 | 9/1977 | Hermans | 528/68 |
| 4,086,207 | 4/1978 | Cassandrini et al. | 528/68 |
| 4,375,521 | 3/1983 | Arnold | 524/590 |
| 4,384,052 | 5/1983 | McBrayer et al. | 528/68 |
| 4,442,256 | 4/1984 | Miller | 524/590 |

FOREIGN PATENT DOCUMENTS

| | | | |
|---|---|---|---|
| 0005734 | 2/1974 | Japan | 524/590 |
| 50-16039 | 12/1975 | Japan . | |
| 51-18736 | 2/1976 | Japan . | |
| 0061694 | 6/1978 | Japan | 524/590 |
| 0199087 | 10/1985 | Japan | 524/589 |
| 1047046 | 11/1966 | United Kingdom | 524/590 |
| 1393401 | 5/1975 | United Kingdom . | |
| 1393402 | 5/1975 | United Kingdom . | |

OTHER PUBLICATIONS

"Progress in Organic Coatings", vol. 5 (1971), pp. 237-243.

Primary Examiner—Herbert J. Lilling
Attorney, Agent, or Firm—Low, Price, LeBlanc, Becker & Shur

[57] ABSTRACT

A composition containing dispersed pigment comprises, as a dispersing agent, a reaction product of at least one polyamine having two or more primary amino groups and/or secondary amino groups and at least one polyisocyanate having two or more isocyanate groups.

16 Claims, No Drawings

COMPOSITION CONTAINING DISPERSED PIGMENT AND PREPARATION METHOD THEREOF

BACKGROUND OF THE INVENTION

1. Field of the Invention

This invention concerns a composition containing pigment dispersed in a reaction product of polyamines and polyisocyanates. More particularly, this invention relates to a composition containing at least a pigment dispersed in a dispersing agent, which possesses excellent dispersion stability of the pigment, lower thixotropy and an excellent flow property.

2. Description of the Prior Art

In conventional compositions containing dispersed pigments composed of pigments, resins and solvents, if the dispersibility of the pigment to the resin is poor, the composition containing the dispersed pigment exhibits remarkable thixotropy due to the flocculation of the pigment. Further, since paint films formed by applying a composition containing a dispersed pigment having flocculated pigments cause various problems such as degradation in the gloss, a decrease in the distinctiveness of image, reduction in the color strength, flooding, etc., sufficient performance of the pigment can not be obtained with such compositions containing the dispersed pigment.

In order to overcome the foregoing problems, various inventions have been proposed as described below.

(1) There has been a method of incorporating certain pigment derivatives into pigment as shown in Japanese Patent Laid-Open No. 18736/1976, but this method can not be applied to general use for various pigments since such pigment derivatives are colored by those structures.

(2) There has also been disclosed, for example, in Japanese Patent Laid-Open No. 160396/1975 and British Patent Specification Nos. 1393401 and 1393402 a technique of utilizing, as a dispersing agent, those compounds obtained by reacting three groups of compounds, that is, organic compounds having at least two isocyanate groups, i.e., polyisocyanate (group A), organic compounds having at least two functional groups reactive with the isocyanate groups, for example, amino groups or hydroxyl groups (group B) and polymers (group C) having one functional group reactive with the isocyanate groups. These dispersing agents have, however, the defect as described below.

The design concept for the dispersing agent of this type is to prepare a block structure comprising chains that can be solvated with solvents and polar anchor group portions adsorptive to the pigment as stated by A. Topham in "Progress in Organic Coatings", Vol. 5, (1977), pp 237–243. When employing this technique, it is necessary to prepare a composition containing dispersed pigment comprising the dispersing agent as described above, the solvent and the pigment and, in the case of preparing paints using the composition, it is generally further necessary to add various types of resins as the film forming vehicles. In this case, the type and amount of vehicle resins to be added as the film forming ingredients are restricted in view of the compatibility between the film forming resins and the polymer constituting the dispersing agent. Accordingly, it has been difficult to use such dispersing agents for general purpose application. Particularly, they have insufficient effects on the pigments and poor dispersibility, for example, with quinacridone pigments. Further, problems may occur in the durability or other areas of film performance of the paint films containing a large amount of dispersing agent used for dispersing pigments as described in the prior art and literature. A certain complexity of production steps required to utilize these prior techniques is imposed, such as the requirement for the prior synthesis of the dispersing agent, as well as the prior synthesis of the ingredients, that is, the polymers of the group C, necessary for synthesizing the dispersing agent.

Moreover, the conventional dispersing agents have previously been synthesized and have been used by being blended with pigments and vehicle resins upon dispersing the pigments. Since the conventional dispersing agents have been prepared and used in these ways, when they are used, for example, for the preparation of paints, they produce undesirable effects on the paints and the condition of the paint films due to the restriction caused from the composition of the dispersing agents, such as poor compatibility between the dispersing agents and the vehicle resins, the restrictions on the types of solvents to be used or a reduction in the water resistance of the paint films.

SUMMARY OF THE INVENTION

One object of this invention is to provide a composition containing dispersed pigment having an excellent dispersion stability for the pigments.

Another object of this invention is to provide a method of preparing a composition containing dispersed pigment that is excellent in dispersion stability of the pigments.

The term "dispersion stability" used herein means that a pigment can be finely dispersed and that the dispersed pigment is present, in a stable state with no flocculation.

This invention concerns a composition containing dispersed pigment containing, as a dispersing agent, one or more reaction products obtained from at least one organic compound having two or more primary amino groups and/or secondary amino groups (hereinafter referred to as polyamines) and at least one organic compound having two or more isocyanate groups (hereinafter referred to as polyisocyanates).

In another aspect, this invention concerns a composition containing dispersed pigment, which comprises pigments, vehicle resins, reaction products as described above and, optionally, organic solvents.

In a further aspect, this invention concerns a method of preparing a composition containing dispersed pigments, which comprises mixing and dispersing pigments, vehicle resins, at least one polyamine, at least one polyisocyanate and, optionally, organic solvents.

DETAILED DESCRIPTION OF THE INVENTION

Pigments

In this invention, various types of inorganic pigments or organic pigments that are usually employed in the paint or printing ink industry can be used. The inorganic pigments can include, for example, zinc white, titanium dioxide, antimony white, iron oxide red, iron oxide yellow, transparent iron oxide, red lead, cadmium yellow, zinc sulfide, lithopone, barium sulfate, lead sulfate, barium carbonate, white lead, alumina white and carbon black. The organic pigments can include, for example, various pigments such as azo series, polycondensation azo series, metal complex azo series, benzimidazolone series, phthalocyanine blue series, phthalocyanine green series, thioindigo series, anthraquinone series, flavanthrone series, indanthrene series, anthrapyrimidine series, pyranthrone series, isoindolinone series, perylene series, perinone series and quinacridone.

While this invention is mainly directed, among those described above, to the use of carbon black and organic pigments which have been considered as difficult to disperse, this invention can of course be applied also to other pigments with improved dispersibility of the pigments.

Resins

As the vehicle resins usable in this invention, those vehicle resins usually employed in the preparation of paints and printing inks can advantageously be used and include, for example, alkyd resins, polyester resins, acrylic resins, vinyl resins such as polyvinyl chloride, polyvinyl acetate, chlorinated polyolefins and polyamide resins.

Polyamines

The organic compound having two or more primary and/or secondary amino groups, that is, polyamines, usable in this invention can include various kinds of polyamines, for example, ethylenediamine, 1,3-propylenediamine, hexamethylenediamine, diethylenetriamine, triethylenetetramine, tetraethylenepentamine, pentaethylenehexamine, bisaminopropylpiperazine, bisaminopyridine, xylylenediamine, metaphenylenediamine, 4,4'-diaminodiphenylmethane and polyethyleneimine. Among them, those polyamines having three or more of primary and/or secondary amino groups or those polyamines having two or more primary and/or secondary amino groups and one or more tertiary amino groups are used preferably. Preferred polyamines include, for example, diethylenetriamine, triethylenetetramine, tetraethylenepentamine, pentaethylenehexamine, polyethyleneimine prepared through cationic polymerization of ethyleneimine, that is, commercially available polyethyleneimine represented by the structure as shown in the following formula (A), bisaminopropyl piperazine and bisaminopyridine:

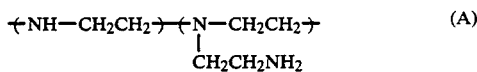

(A)

Polyisocyanates

The polyisocyanates usable in this invention can include, for example, those diisocyanate compounds such as tolylene diisocyanate (TDI), 4,4-diphenyl methane diisocyanate (MDI), xylylene diisocyanate (XDI), hexamethylene diisocyanate, hydrogenated MDI, hydrogenated TDI, hydrogenated XDI and isophorone diisocyanate. More preferably, the use of higher polyfunctional polyisocyanate compounds is advantageous.

Such compounds can include, for example, those compounds prepared by reacting polyols with diisocyanates such as represented by formulas (1)–(4), those compounds prepared through biuret reaction from diisocyanates, for example, represented by formula (5), those compounds prepared through the ring formation of diisocyanates such as compounds represented by the formulas (6)–(8) and those compounds represented by the formulas (9) and (10).

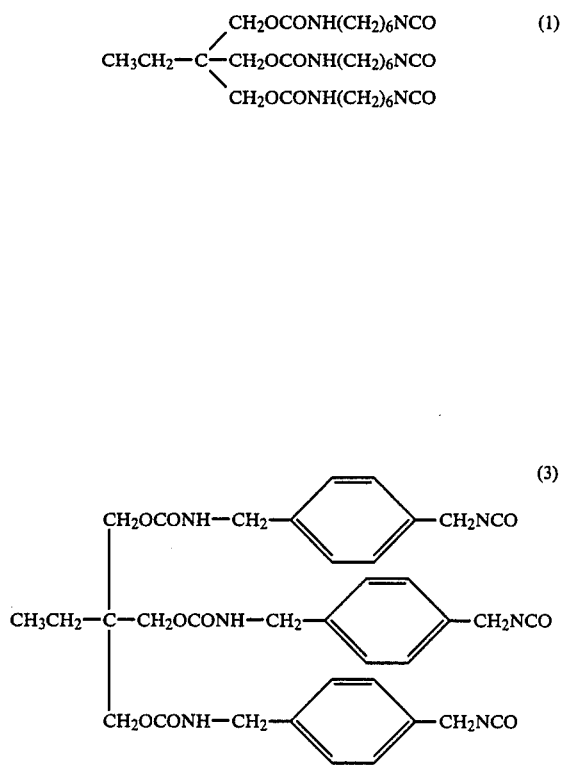

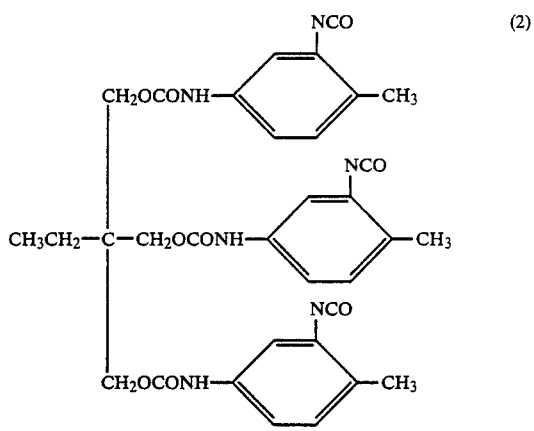

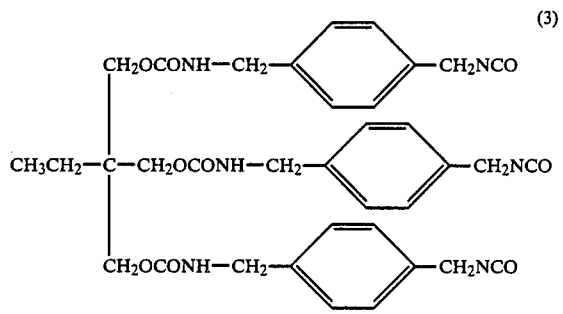

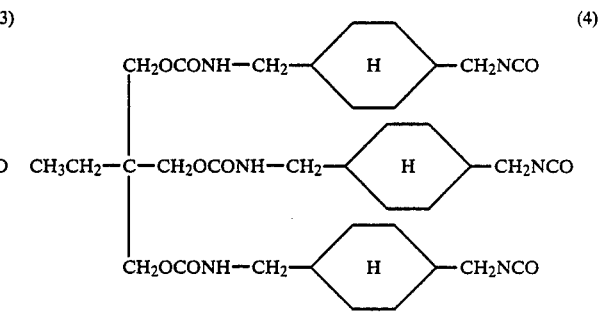

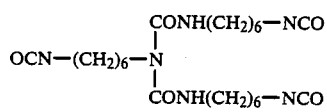 (5)

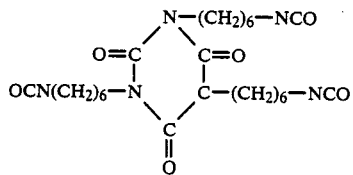 (6)

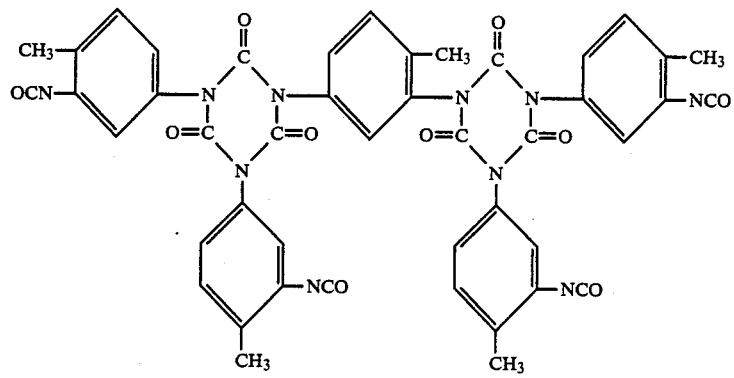 (7)

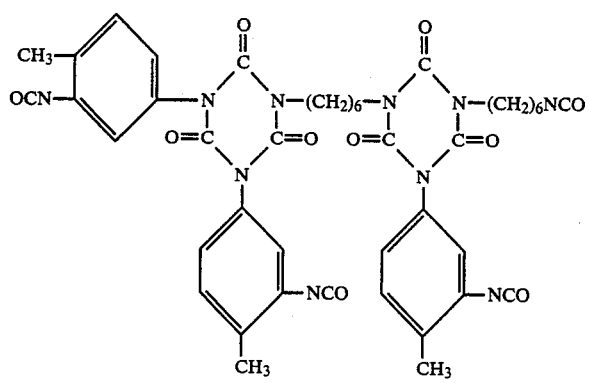 (8)

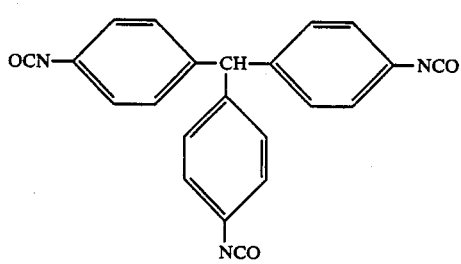 (9)

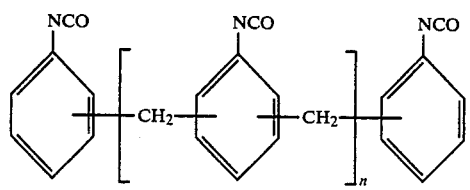 (10)

where n represents an integer from 1 to 4.

Commercially available products containing the abovementioned compounds as the main ingredient are exemplified as described below:

Coronate HL (trade name of products available from Nippon Polyurethane Industries Co., Ltd.) containing the compound of formula (1) as the main ingredient;

Sumidur L (trade name of products available from Sumitomo Bayer Urethane Co., Ltd.) containing the compound of formula (2) as the main ingredient;

Takenate D 110N (trade name of products available from Takeda Chemical Industries Co., Ltd.) containing the compound of formula (3) as the main ingredient;

Takenate D-120N (trade name of products available from Takeda Chemical Industries Co., Ltd.) containing the compound of formula (4) as the main ingredient;

Takenate D-165N, Takenate D-165N-90CX (trade name of products available from Takeda Chemical Industries Co., Ltd.), and Sumidur N (trade name of products available from Sumitomo Bayer Urethane Co., Ltd.) containing the compound of formula (5) as the main ingredient;

Coronate EH (trade name of products available from Nippon Polyurethane Industries Co., Ltd.) containing the compound of formula (6) as the main ingredient;

Desmodule IL (trade name of products available from Bayer AG) containing the compound of formula (7) as the main ingredient;

Desmodule HL (trade name of products available from Bayer AG) containing the compound of formula (8) as the main ingredient;

Desmodule R (trade name of products available from Bayer AG) containing the compound of the formula (9) as the main ingredient;

Millionate MR (trade name of products available from Nippon Polyurethane Industries Co., Ltd.) containing the compound of the formula (10) as the main ingredient.

Each of the commercial products is not a pure chemical but a mixture of a compound of the structure shown by each of the formulas as the main ingredient and a compound of a structure similar to that of the main ingredient, and the respective products have an average number of functional groups (number of isocyanate groups per average molecular weight) of from 2.5 to 6.

Organic Solvents

The solvents usable in this invention are those ordinarily employed in the paint and printing ink industries, and can include, for example, hydrocarbon series solvents such as toluene, xylene, Solvesso 100 and Solvesso 150 (trade name of products available from Esso Standard Co. Ltd.), ester series solvents such as ethyl acetate and butyl acetate, ketone series solvents such as methyl ethyl ketone and methyl isobutyl ketone and ether series solvents such as ethylene glycol monoethyl ether and ethylene glycol mono-normal butyl ether. These solvents may be used alone or as a mixture of two or more different solvents.

Mixing Ratio of Polyamines and Polyisocyanates

The polyamines and polyisocyanates are preferably used in such a blending ratio whereby primary and/or secondary amino groups are present at least in an amount equivalent to the isocyanate groups, and it is generally preferred to use the amino groups in excess of an amount equivalent to the isocyanate groups.

In the case of using polyamines containing the primary and/or secondary amino groups with an excess blending of the amino groups to the isocyanate groups, it is generally advantageous to use and blend polyamines containing three or more primary and/or secondary amino groups such that at least two of the amino groups can react with the isocyanate groups.

In the case of using polyamines containing primary and/or secondary amino groups and tertiary amino groups, it is generally advantageous to blend polyisocyanates such that the isocyanate groups are present in an amount equal to or less than equivalent to the primary and/or secondary amino groups. More preferably, a polyamine containing four or more primary and/or secondary amino groups and a polyisocyanate having an average number of functional groups (that is, the number of isocyanate groups/average molecular weight) of 2.5 or 2.5–6 are used and blended such that at least three amino groups of the polyamine are reacted with the isocyanate groups. Also in these cases, the total amount of the primary amino groups, the secondary amino groups and the tertiary amino groups before reaction is preferably from 1.05 to 5 times the equivalent amount of the isocyanate groups.

Mixing Ratio of Pigments and Other Ingredients

The mixing ratio between the total amount of the polyamines and the polyisocyanates and the pigments, based on 100% by weight of the total amount of the polyamines, the polyisocyanates and the pigments, has to be such that from 99.9 to 70% by weight of the pigments are mixed with from 0.1 to 30% by weight of the total amount of the polyamines and the polyisocyanates. A more preferred mixing ratio is from 99 to 80 parts by weight of the pigments based on from 1 to 20 parts by weight of the total amount of the polyamines and the polyisocyanates.

If the amount of the polyamines and the polyisocyanates used is less than 0.1% by weight, no sufficient effect of this invention can be attained. While on the other hand, if it exceeds 30% by weight, the viscosity of the composition containing the dispersed pigment is significantly and undesirably increased.

Mixing Ratio of Resins and Pigments

The mixing ratio between the vehicle resins and the pigments in the composition containing the dispersed pigment according to this invention usually ranges from 98 to 10 parts by weight of the pigments based on from 2 to 90 parts by weight of the solid component in the vehicle resins in the preparation or the like for reasons of economy. A more preferred blending ratio ranges from 97 to 30 parts by weight of the pigments based on from 3 to 70 parts by weight of the solid component in the vehicle resins.

Reaction of Polyamines and Polyisocyanates

Vehicle resins generally employed in the paint or printing ink industries have hydroxyl groups or carboxyl groups as the functional groups, which are in most cases reactive with isocyanate groups. However, since the reactivity between the amines and the isocyanates is significantly higher than the reactivity between the vehicle resins and the isocyanates, if the reaction is carried out between the amines and the isocyanates under the coexistence of the vehicle resins or pigments, substantial reactions occur only between the amines and the isocyanates. This can be confirmed by determining the amount of unreacted amino groups after the reaction between the amines and the isocyanate by potentiometric titration as shown in Examples 2 and 3. That is, the amount of the unreacted amino groups is substantially equal to the difference between the amount of the amino groups and that of the isocyanate groups used for the reaction.

Although the amines and the isocyanates generally cause a rapid chemical reaction at a room temperature, the temperature may be increased or organotin compounds or the like may be used as a catalyst in a case where it is required to complete the chemical reaction between the reactants more quickly.

Materials prepared by mixing and reacting the amines and the isocyanates in the absence of pigments and vehicles are generally difficult to dissolve in the solvents usually employed in the paint and printing ink industries. For instance, when the polyamines and polyisocyanates are reacted in the absence of vehicle resins a solvent such as toluene, precipitation results. A composition containing dispersed pigment superior to conventional compositions can be obtained by adding vehicle resins, pigments and an optional organic solvent to the precipitate, and then dispersing.

While on the other hand, when the polyamines and the polyisocyanates are reacted in solutions containing vehicle resins and, optionally, organic solvents, the materials resulting from the reaction are dissolved or finely dispersed in the solution of the resins. Particularly, in when the polyamines and the polyisocyanates are reacted at such a blending ratio as to leave the amino groups in the vehicle resins having polar functional groups such as carboxyl groups and, optionally, in organic solvents, the reaction products are dissolved more and are excellent for dispersing the pigments.

It has been found that when the pigments are dispersed in a mixture comprising the reaction products of the polyamines and polyisocyanates, the vehicles resins and, optionally, organic solvents as described above, the reaction products can provide the effect of stabilizing the dispersed pigments.

Preparation of Composition containing Dispersed Pigment

A particularly preferred method for preparing a composition containing dispersed pigment comprises adding polyamines and polyisocyanates to a mixture of pigments, a solution of vehicle resins and an optional organic solvent while the mixture is being dispersed, or comprises adding polyamines and polyisocyanates to a mixture of vehicle resins and an optional organic solvent, and then adding pigments to the mixture, and after that, dispersing the pigments.

As the dispersing equipment for pigments in this case, dispersing equipment usually employed in the paint or printing industries, for example, sand grinding mill, ball mill, roll mill, attritor and dissolver can be used as required.

Advantage of the Invention

In accordance with this invention, a composition containing dispersed pigment excellent in dispersion stability and having a preferred flowing property can be obtained in an extremely simple process.

Further, the composition containing the dispersed pigment according to this invention is applied to the paint, (1) by the method of forming reaction products of the polyamines and the polyisocyanates having high dispersibility in the vehicle resins used, or (2) by the method of dispersing the pigments by mixing the vehicle resins into the reaction products of the polyamines and the isocyanates. This invention, when practiced in such embodiments, can provide various industrial advantages such as simplification of the production steps which have hitherto brought about problems in the prior art, as well as improvements in the dispersibility and the stability in dispersion of the pigments, and elimination of the restriction on resins used together caused by the compatibility and the like.

Furthermore, since the blending ratio of the dispersing agent is from 0.1 to 30% by weight based on the total amount of the pigments and dispersing agent in this invention, while about 4.8 to 50% by weight of dispersing agent based on the total amount of the pigments and dispersing agent have been required in the prior art, the amount of vehicle resins used and the range for selecting them can be greatly extended.

Accordingly, the durability and other performance properties of the paint films when formed with the composition containing dispersed pigments according to this invention do not substantially suffer from undesired effects by the composition containing dispersed pigment. Paint, printing ink, and the like prepared by using the composition containing the dispersed pigment according to this invention can provide paint films excellent in gloss, distinctiveness of image, color strength, flooding and the like.

Differing from the dispersing agents of the prior art, the dispersing agent according to this invention can be synthesized in the process of dispersing the pigment through the direct mixing of specific starting materials with pigments, by which the composition containing dispersed pigment can be prepared in situ. Alternatively, the dispersing agent of this invention can previously be synthesized in a solvent, which can then be used for the preparation of the composition containing dispersed pigment. Furthermore, the dispersing agent of this invention can easily be synthesized in the presence of a wide variety of vehicle resins for use in the paint or the like, through which drawbacks involved in the conventional dispersing agents can be eliminated.

EMBODIMENT OF THE INVENTION

The following examples of this invention and Comparative Examples shown below are given solely for the easy understanding of this invention, and are thus in no way restrictive.

In the following Examples and Comparative Examples, "part" means parts by weight and "%" means % by weight unless otherwise specified.

EXAMPLE 1

50 parts of a short oil alkyd resin modified with coconut oil (acid value 8, a hydroxy value 80, 60% solid content), 30 parts of methyl isobutyl ketone and 20 parts of Cinquasia red Y (trade name of products of quinacridone series organic pigment, manufactured by E. I. du Pont de Nemours & Company) were subjected to dispersing treatment by a sand grind mill for 10 min and, thereafter, 0.28 parts of ethylene diamine were added to the thus formed mixture. Further, while continuing the dispersing treatment, 1.22 parts of 4,4'-methylene bis[cyclohexylisocyanate] (hydrogenated MDI) were added to the mixture formed by the mixing treatment as described above, and the dispersing treatment was continued for a further 20 minutes. A composition containing the dispersed pigment (1) was thus prepared.

For comparison, the same 50 parts of the coconut oil modified alkyd resin, 30 parts of the methyl isobutyl ketone and 20 parts of the Cinquasia red Y were subjected to the dispersing treatment in a sand grind mill for 30 minutes to prepare a composition containing the dispersed pigment (2). The viscosity of the composition containing dispersed pigment (1) and that of the composition containing dispersed pigment (2) were measured by a Model E viscometer (manufactured by Tokyo Keiki Co., Ltd.). The results are shown in Table 1.

TABLE 1

| Roter Speed | 5 rpm | 50 rpm |
|---|---|---|
| Composition containing dispersed pigment (1) | 160 cps | 145 cps |
| Composition containing dispersed pigment (2) | 696 cps | 132 cps |

It is apparent from the results of the above-described experiment that the composition containing dispersed pigment (1) prepared by the method according to this invention has an extremely excellent flowing property with lower thixotropy.

EXAMPLE 2

0.63 parts of tetraethylenepentamine were added to a mixture of 50 parts of the coconut oil modified alkyd resin as used in Example 1 and 30 parts of Solvesso 100 (trade name of products available from Esso Standard Co., Ltd.) and 0.87 parts of 4,4'-methylene bis[cyclohexylisocyanate] (hydrogenated MDI) were added to the thus obtained mixture being stirred with a dissolver. When measuring the amount of amino groups contained in the thus obtained resin solution in acetic acid by way of potentiometric titration using perchloric acid as a tritration reagent, 0.123 mmol of perchloric acid was required for neutralizing 1 g of the resin solution. The amount is equal to the difference between the amount of the amino groups in the tetraethylene-pentamine and the amount of the isocyanate groups added.

Since it was confirmed that the alkyd resin and Solvesso 100 had no amino groups by way of the potentiometric titration, it was ensured that the isocyanate groups added had reacted partially with the amino groups of tetraethylenepentamine. 20 parts of the same pigments as in Example 1 were added to 81.5 parts of the resin solution as described above and the thus obtained mixture was subjected to dispersing by a sand grinding mill for 30 minutes to thereby obtain a composition containing the dispersed pigment (3).

Further, a composition containing dispersed pigment (4) was obtained with the same procedures as above except for using 0.4 parts of tetraethylenepentamine and 1.1 parts of 4,4'-methylene bis[cyclohexylisocyanate] (hydrogenated MDI). Further, a composition containing dispersed pigment (5) was obtained in the same procedures while replacing tetraethylenepentamine with 0.28 parts of ethylene diamine and using 1.22 parts of 4,4'-methylene bis[cyclohexylisocyanate] (hydrogenated MDI).

While on the other hand, 20 parts of the same pigment as described above were added to 50 parts of the alkyd resin and 30 parts of the Solvesso 100 also as described above and the thus obtained mixture was subjected to the dispersing treatment in a sand grind mill for 30 minutes to obtain a composition containing dispersed pigment (6).

The viscosity for each of the compositions containing dispersed pigment was measured by a Model E viscometer manufactured by Tokyo Keiki Co., Ltd. The results are shown in Table 2.

TABLE 2

| Roter Speed | 5 rpm | 50 rpm |
|---|---|---|
| Composition containing dispersed pigment (3) | 387 cps | 315 cps |
| Composition containing dispersed pigment (4) | 365 cps | 309 cps |
| Composition containing dispersed pigment (5) | 872 cps | 415 cps |
| Composition containing dispersed pigment (6) | 731 cps | 230 cps |

The compositions containing dispersed pigment (3) and (4) exhibited excellent flowing property with lower thixotropy.

50 parts of the same coconut oil modified alkyl resin as described above and 30 parts of Uvan 128, i.e., trade name of melamine formaldehyde resin varnish manufactured by Mitsui Toatsu Chemical Co., Ltd., were combined to thereby prepare a baking type alkyd melamine resin paint.

Each of the paints are described above was diluted with a thinner to a viscosity suitable for spraying and then spray coated on a tin plate. The thus coated tin plate was kept in the air at 140° C. for 30 minutes and, thereafter, 20° gloss and 60° gloss for the paint film were measured.

Further, after applying each of the diluted paints on the tin plate by way of flow coating which means such a coating process of putting approx. 5 cc of paint on a tin plate sized 50 mm × 150 mm, coating the tin plate by disposing the plate vertically thereby causing the paint to flow downwardly and then keeping it as it is for 10 minutes), the coated tin plate was kept in air at 140° C. for 30 minutes and the paint film was baked. The 20° gloss of the paint film thus obtained was measured. The results are as shown in Table 3.

TABLE 3

| | Spray coating | | Flow coating |
|---|---|---|---|
| | 20° | 60° | 20° |
| Composition containing dispersed pigment (3) | 85 | 92 | 79 |
| Composition containing dispersed pigment (4) | 87 | 93 | 82 |
| Composition containing dispersed pigment (5) | 77 | 89 | 45 |
| Composition containing dispersed pigment (6) | 72 | 89 | 22 |

It is apparent from Table 3 that the compositions containing dispersed pigment (3) and (4) are excellent, with the composition containing dispersed pigment (4) being particularly excellent.

While tetraethylenepentamine and polyisocyanate compounds were blended such that two out of the five amino groups of tetraethylenepentamine were reacted with the isocyanate groups in the composition containing dispersed pigment (3), tetraethylenepentamine and polyisocyanate compounds were blended such that four amino groups of the tetraethylenepentamine were reacted in the composition containing dispersed pigment (4).

In this way, by reacting more amino groups contained in the polyamine, the effect of this invention can further be improved.

In the composition containing the dispersed pigment (5), ethylenediamine was used and it was blended with the polyisocyante compound such that all of the amino groups were reacted with the isocyanate groups. Although the composition containing dispersed pigment (5) was superior as compared with the composition containing dispersed pigment (6) of this invention, it was inferior to the compositions containing dispersed pigment (3) and (4).

These experiments demonstrated the fact that the use of amino groups in excess with respect to the isocyanate groups is preferred so that the reaction product of the polyamine and the polyisocyanate contains amino groups.

EXAMPLE 3

0.32 parts of tetraethylenepentamine were added to a mixture of 50 parts of the coconut oil modified alkyd resin as used in Example 1 and 30 parts of Solvesso 100 (trade name of products manufactured by Esso Standard Co., Ltd.). 1.18 parts of a trimer of hexamethylene-1,6-diisocyanate having a biuret structure, that is, Takenate D-165N-90CX (trade name of products available from Takeda Chemical Industries Co., Ltd.) (amine equivalent 200) was added to the thus obtained mixture under stirring by a dissolver. The mixture was stirred by the dissolver for further 30 minutes, produced a resin solution (A).

The amount of the amino groups contained in one g of the thus obtained resin solution (A) was measured by the method as described in Example 2. It was equivalent to 0.03 mmol of perchloric acid, which was equal to the difference between the amount of the amino groups and that of the isocyanate groups added.

20 parts of the same pigment as in Example 1 were added to 81.5 parts of the resin solution (A) and the thus obtained mixture was subjected to a dispersing treatment by the sand grind mill for 30 minutes to form a composition containing dispersed pigment (7). The viscosity was measured by a Model E viscometer manufactured by Tokyo Keiki Co., Ltd. The composition containing dispersed pigment (7) had a viscosity lower than that for each of the compositions containing the dispersed pigment in Example 2 as shown in Table 4 and exhibited excellent flow property with lower thixotropy.

TABLE 4

| Roter Speed | 5 rpm | 50 rpm |
|---|---|---|
| Composition containing dispersed pigment (7) | 235 cps | 218 cps |

To 100 parts of the composition containing dispersed pigment (7) as described above, were added the same 50 parts of the coconut oil modified alkyd resin and 30 parts of the melamine formaldehyde resin varnish as in Example 2 to prepare a baking type melamine alkyd resin paint. The paint was diluted with a thinner to a viscosity suitable for spraying and spray coated onto a tin plate. The thus obtained tin plate was kept in air at 140° C. for 30 minutes, which baked the paint film. 20° gloss and 60° gloss of the thus obtained paint film, as well as the 20° gloss of the paint film obtained by the flow coating were measured. The results are shown in Table 5.

TABLE 5

| | Spray coating | | Flow coating |
|---|---|---|---|
| | 20° gloss | 60° gloss | 20° gloss |
| Composition containing dispersed pigment (7) | 89 | 93 | 84 |

The composition containing dispersed pigment (7) exhibited superior results to the composition containing dispersed pigment (4) in Example 2 by using a polyfunctional polyisocyanate having more than 2 isocyanate groups.

EXAMPLE 4

0.63 parts of tetraethylenepentamine were added to 30 parts of methyl isobutyl ketone and the thus obtained mixture was stirred in a dissolver. 0.87 parts of 4,4'-methylene bis[cyclohexylisocyanate] (hydrogenated MDI) were applied to the above-mentioned mixture under stirring. A rapid exothermic reaction occurred to form white precipitates. To the thus obtained mixture of reaction product and methyl ethyl ketone, were applied the same 50 parts of the coconut oil-modified alkyd resin and 20 parts of pigments are used in Example 1 and 120 parts of glass beads of 1.5 mmφ. The thus obtained mixture was subjected to a dispersing treatment in a paint shaker for 2 hours to form a composition containing dispersed pigment (8).

While on the other hand, the same 50 parts of the coconut oil-modified alkyd resin and 0.63 parts of tetraethylenepentamine as described above were added to 30 parts of methyl isobutyl ketone, and 0.87 parts of 4,4'-methylene bis[cyclohexylisocyanate] (hydrogenated MDI) were added to the thus formed mixture under stirring by a dissolver, followed by continued stirring for further 30 minutes. To the thus obtained resin solution, were added 20 parts of the same pigment as in Example 1 and 120 parts of glass beads of 1.5 mmφ and the obtained mixture was shaken in a paint shaker of 2 hours to prepare a composition containing dispersed pigment (9).

To each 100 parts of the composition containing dispersed pigment (2) in Example 1 and compositions containing dispersed pigments (8) and (9) in this example, were added the same 50 parts of the coconut oil modified alkyl resin and 30 parts of melamine resin varnish as in Example 2, to prepare baking type melamine alkyd resin paints, respectively. The paints were diluted with a thinner to a viscosity suitable for spraying. Each of the thus obtained diluted paints was flow-coated on a tin plate (after putting about 5 cc of paint to the upper part of a tin plate sized 50 mm×150 mm, the paint was caused to flow downwardly by disposing the tin plate vertically to coat the tin plate and then kept as it was for 10 minutes). The thus coated tin plate was kept in air at 140° C. for 30 minutes and the paint film was baked. The 20° gloss of the thus obtained paint film is shown in the following Table 6.

TABLE 6

| | 20° gloss |
|---|---|
| Composition containing dispersed pigment (2) | 29 |
| Composition containing dispersed pigment (8) | 69 |
| Composition containing dispersed pigment (9) | 84 |

As apparent from Table 6, the compositions containing dispersed pigment (8) and (9) had excellent performance, with the composition containing dispersed pigment (9) being particularly preferred.

EXAMPLE 5

To each 81.5 parts of the resin solution (A) in Example 3, was added each 20 parts of Novoperm orange HL-70 (trade name of azo series pigment products, manufactured by Hoechst A.G.), Hostaperm yellow H-3G (trade name of azo series organic pigment of products manufactured by Hoechst A.G.) and Paliogen red L-3910HD (trade name of perylene series organic pigment of products, manufactured by BASF AG), respectively. The thus obtained mixtures were subjected to the dispersing treatment in a ball mill for 24 hours to prepare compositions containing dispersed pigment (10), (12) and (14), respectively.

For the comparison, 20 parts of each of the pigments as described above were added to 50 parts of the coconut oil modified alkyd resin and 30 parts of Solvesso 100 (trade name of products manufactured by Esso Standard Co., Ltd.). The thus obtained mixtures were subjected to the dispersing procedures in a ball mill for 24 hours to form compositions containing dispersed pigment (11), (13) and (15), respectively.

The viscosity for each of the compositions containing dispersed pigment is shown in the following Table 7. Further, 50 parts of coconut oil modified alkyd resin and 30 parts of melamine formaldehyde resin varnish were added to the respective compositions containing dispersed pigment as in Example 2, to prepare melamine alkyd resin paints. The thus prepared melamine alkyd resin paints were spray coated on tin plates and the thus coated tin plates were kept in air at 140° C. for 30 minutes to effect baking of the paint films. The 20° gloss and the 60° gloss of the paint film thus obtained were measured. The results are also shown in the following Table 7.

TABLE 7

| Pigment | Composition containing dispersed pigment | Viscosity 5 rpm | 50 rpm | Spray coating 20° gloss | 60° gloss |
|---|---|---|---|---|---|
| Novoperm orange | (10) | 127 cps | 122 cps | 88 | 93 |
| HL-70 | (11) | 510 cps | 166 cps | 80 | 91 |
| Hostaperm yellow | (12) | 341 cps | 290 cps | 88 | 92 |
| H-3G | (13) | 1134 cps | 324 cps | 76 | 90 |
| Paliogen red | (14) | 1898 cps | 615 cps | 86 | 91 |
| L-3910HD | (15) | 2365 cps | 586 cps | 75 | 89 |

From the experiment as described above, it was found that the composition containing the dispersed pigment according to this invention had excellent performance as compared with compositions prepared using conventional dispersing methods. of the pigments.

EXAMPLE 6

0.56 parts of diethylenetriamine were added to a mixture of 45 parts of the same alkyd resin in Example 1 and 45 parts of xylene and the thus obtained mixture was stirred by a dissolver. 3.65 parts formed from an adduct of 3 mol of hexamethylene diisocyanate and 1 mol of trimethylol propane, that is, Coronate HL (trade name of products containing 25% ethyl acetate and 12.5% NCO, manufactured by Nippon Polyurethane Industries Co., Ltd.) were added to the above-mentioned mixture under stirring by a dissolver, to obtain a resin solution. Then, 10 parts of carbon black MA-100 (trade name of products available from Mitsubishi Chemical Industries Ltd.) were added to the resin solution and the thus obtained mixture was subjected to a dispersing treatment in a sand grind mill for 30 minutes. In this manner, a composition containing dispersed pigment (16) was obtained. For the comparison, a composition containing dispersed pigment (17) was prepared in the same procedures as described above without adding polyamine and polyisocyanate.

The viscosity for each of the compositions was measured by a rotary Model E viscometer (manufactured by Tokyo Keiki Co., Ltd.). The results are shown in the following Table 8.

TABLE 8

| Roter Speed | 5 rpm | 50 rpm |
|---|---|---|
| Composition containing dispersed pigment (16) | 75 cps | 68 cps |
| Composition containing dispersed pigment (17) | 895 cps | 173 cps |

EXAMPLE 7

50 parts of Acrydic A-405 (trade name of acrylic resin varnish products, available from Dainippon Ink & Chemicals, Inc.), 50 parts of xylene, 20 parts of Hostaperm yellow H-3G (trade name of products available from Hoechst AG) were subjected to dispersing a treatment in a grind mill for five minutes. 0.32 parts of tetraethylenepentamine were added to the thus obtained mixture and 1.72 parts of Sumidur (trade name of products containing 16.5% NCO, 12.5% of methyl glycol acetate and 12.5% of xylene, manufactured by Sumitomo Bayer Urethane Co. Ltd.) were added to the thus obtained mixture under the dispersing treatment and further subjected to a dispersing treatment for 25 minutes to obtain a dispersed paste (18).

For the comparison, a composition containing dispersed pigment (19) was prepared without adding amine and isocyanate. 90 parts of Acrydic A-105 and 60 parts of Super Beckamine J-820 (trade name of products of melamine resin varnish, manufactured by Dainippon Ink & Chemical Industries Co., Ltd.) were added to the compositions containing dispersed pigments respectively, to prepare baking type melamine acrylic resin paints. Each of the paints was coated on a glass plate by using a 6 mil applicator and baked at 150° C. for 30 minutes. The 20° gloss and the 60° gloss for the obtained paint film were measured. The results are shown in Table 9.

TABLE 9

|  | 20° gloss | 60° gloss |
|---|---|---|
| Composition containing dispersed pigment (18) | 88 | 94 |
| Composition containing dispersed pigment (19) | 72 | 90 |

Table 9 shows that the composition containing dispersed pigment (18) according to this invention is superior to the Comparative Example, that is, the composition containing dispersed pigment (19).

EXAMPLE 8

25 parts of toluene and a further 20 parts of Transparent oxide red 30-1005 (trade name of products for transparent iron oxide pigment, manufactured by The Hilton-Davis Chemical Co.) were added to 60 parts of Acrydic A-405 (trade name of products manufactured by Dainippon Ink & Chemicals Industries Co., Ltd.), and the thus obtained mixture was subjected to a dispersing treatment by the sand grind mill for five minutes. 0.29 parts of tetraethylenepentamine were added to the thus obtained mixture and, while continuing the dispersing treatment to the mixture, 1.21 parts of Coronate EH (trade name of products containing 21.3% NCO manufactured by Nippon Polyurethane Industries Co., Ltd.) were added and subjected to dispersing a treatment for 25 minutes. In this way, a composition containing dispersed pigment (20) as obtained.

For the comparison, a composition containing dispersed pigment (21) was prepared by the same dispersing treatment by a sand grind mill without adding amine and isocyanate.

The viscosity for each of the compositions containing dispersed pigment was measured by a rotary Model E viscometer (manufactured by Tokyo Keiki Co., Ltd.), and 80 parts of Acrydic A-405 (trade name of products manufactured by Dainippon Ink & Chemical Industries Co., Ltd.) and 60 parts of Super Beckamine J-820 (trade name of products manufactured by Dainippon Ink & Chemical Industries Co., Ltd.) were added respectively to both of the compositions containing the dispersed pigment, to prepare baking type melamine acrylic resin paints. Each of the thus obtained paints was coated on a glass plate using a 6 mil applicator and baked at 150° C. for 30 minutes. The 20° gloss and the 60° gloss for the paint film thus obtained were measured. The results are shown in Table 10.

TABLE 10

|  | Viscosity | | Gloss | |
| --- | --- | --- | --- | --- |
|  | 5 rpm | 50 rpm | 20° | 60° |
| Composition containing dispersed pigment (20) | 1821 cps | 1301 cps | 126 | 119 |
| Composition containing dispersed pigment (21) | 2900 cps | 1208 cps | 117 | 108 |

Table 10 shows that the composition containing dispersed pigment (20) according to this invention is superior to the Comparative Example, that is, the composition containing dispersed pigment (21).

COMPARATIVE EXAMPLE 1

The composition containing dispersed pigment according to this invention, the composition containing dispersed pigment prepared by using the dispersing agent described in the example of Japanese Patent Laid-Open No. 160396/1975 and a composition containing dispersed pigment prepared by using a dispersing agent described as Agent 1 in the British Patent Specification No. 1393401 were compared with each other. Each of the dispersing agents is referred to hereinafter with the numbers as described below.

| Dispersing agent 1 | Japanese Patent Laid-Open No. 160396/1975 | Example 1 |
| --- | --- | --- |
| Dispersing agent 2 | Japanese Patent Laid-Open No. 160396/1975 | Example 8 |
| Dispersing agent 3 | British Patent No. 139401 | Agent 1 |

To 20 parts of Cinquasia red Y (trade name of products available from E. I. du Pont de Nemours & Co.) were added 10 parts of each of the dispersing agents as the solid content and then Solvesso 100 (trade name of products available from Esso Standard Co., Ltd.), so as to make up the entire amount to 60 parts. The thus obtained mixture was subjected to dispersing treatment by a sand grind mill for 30 minutes and, thereafter, 40 parts of the coconut oil modified alkyd resin as described in Example 1 was added and subjected to a dispersing treatment for 10 minutes to obtain compositions containing dispersed pigment (22), (23) and (24) in order of the number of dispersing agent. To each 100 parts of the compositions containing dispersed pigment (3) and (4) in Example 2 and compositions containing dispersed pigment (22), (23) and (24) as described above, were added the same 50 parts of the coconut oil modified alkyd resin and 30 parts of the melamine resin varnish as in Example 2, to prepare baking type alkyd melamine resin paints. Each of the paints was diluted with a thinner to a viscosity suitable for spraying, coated onto a tin plate by way of flow coating and spray-coated and baked at 140° C. for 30 minutes. Then, the 20° gloss on the thus obtained paint film was measured. The results are shown in Table 11.

TABLE 11

|  | Flow coating 20° gloss | Spray coating 20° gloss |
| --- | --- | --- |
| Composition containing dispersed pigment (3) | 79 | 85 |
| Composition containing dispersed pigment (4) | 82 | 87 |
| Composition containing dispersed pigment (22) | 41 | 75 |
| Composition containing dispersed pigment (23) | 33 | 73 |
| Composition containing dispersed pigment (24) | 47 | 80 |

Table 11 shows that the dispersion composition according to this invention, that is, the compositions containing dispersed pigments (3) and (4) are more excellent.

What is claimed is:

1. A resin composition containing a dispersed pigment, comprising:
   (a) from 0.1 to 30 parts by weight of a dispersing agent comprising the reaction product obtained by the reaction of reactants consisting essentially of at least one polyamine having two or more primary amino groups and/or secondary amino groups and at least one polyisocyanate having two or more isocyanate groups, wherein said amino groups are in excess with respect to said isocyanate groups so that said reaction product contains amino groups;
   (b) from 70 to 99.9 parts by weight of a pigment;
   (c) a vehicle resin, the weight ratio of said pigment to the vehicle resin solids being from 98:2 and 10:90; and
   (d) an organic solvent selected from the group consisting of hydrocarbons, esters, ketones and ethers.

2. A resin composition containing a dispersed pigment as defined in claim 1, wherein the polyamines are selected from the group consisting of aliphatic polyamines, heterocyclic polyamines, aromatic polyamines and imines.

3. A resin composition containing a dispersed pigment as defined in claim 2, wherein the polyamines are selected from the group consisting of ethylene diamine, 1,3-propylene diamine, hexamethylene diamine, diethylene triamine, triethylene tetramine, tetraethylene pentamine, pentaethylene hexamine, bisaminopropyl piperidine, bisamino pyridine, xylylene diamine, meta-phenylene diamine, 4,4'-diaminodiphenyl methane and polyethyleneimine.

4. A resin composition containing a dispersed pigment as defined in claim 2, wherein the polyamines are selected from the group consisting of diethylene triamine, triethylene tetramine, tetraethylene pentamine, pentaethylene hexamine, polyethyleneimine, bisaminopropyl piperidine and bisaminopyridine.

5. A resin composition containing a dispersed pigment as defined in claim 1, wherein the polyisocyanate groups are selected from the groups consisting of aromatic polyisocyanates, aliphatic polyisocyanates and cycloaliphatic polyisocyanates.

6. A resin composition containing a dispersed pigment as defined in claim 1, wherein the polyisocyanates are selected from the group consisting of toluylene diisocyanate, 4,4'-diphenylmethane diisocyanate, xylylene diisocyanate, hexamethylene diisocyanate, 4,4'-methylene bis cyclohexylisocyanate, hydrogenated TDI, hydrogenated XDI and isophorone diisocyanate.

7. A resin composition containing dispersed pigment as defined in claim 1, wherein the average number of functional groups of the polyisocyanates is from 2.5 to 6.

8. A resin composition containing a dispersed pigment as defined in claim 1, wherein the polyamines are blended in such an amount so as to contain amino groups from 1.05 to 5 times of a stoichiometrically equivalent amount relative to the isocyanate groups contained in the polyisocyanates.

9. A resin composition containing a dispersed pigment as defined in claim 1, wherein the vehicle resin is selected from the group consisting of alkyd resins, polyester resins, acrylic resins, polyamide resins, polyvinyl acetate and chlorinated polyolefins.

10. A method of preparing a resin composition containing a dispersed pigment, comprising mixing and dispersing (a) a reaction product obtained by the reaction of reactants consisting essentially of at least one polyamine having two or more primary amino groups and/or secondary amino groups, and at least one polyisocyanate having two or more isocyanate groups, said amino groups being in excess with respect to said isocyanate group so that the reaction product between the polyamine and polyisocyanate contains amino groups, (b) a pigment, (c) a vehicle resin, and (d) an organic solvent, said polyamine and polyisocyanate being used in amounts so that the reaction product formed therebetween is present in an amount of 0.1 to 30 parts by weight based on 70 to 99.9 parts by weight of said pigment, the weight ratio of said pigment to the vehicle resin solids being from 98:2 to 10:90.

11. A method for preparing a resin composition containing a dispersed pigment as defined in claim 10, wherein the average number of functional groups of the polyisocyanates is from 2.5 to 6.

12. A method of preparing a resin composition containing a dispersed pigment as defined in claim 10, wherein the polyamines are blended in such an amount so as to contain amino groups from 1.05 to 5 times of the stoichiometrically equivalent amount relative to the isocyanate groups contained in the polyisocyanates.

13. A method of preparing a resin composition containing a dispersed pigment as defined in claim 10, wherein the polyamines and the polyisocyanates are added to and dispersed in the pigment, the vehicle resin and the organic solvent while mixing and dispersing them.

14. A method of preparing a resin composition containing a dispersed pigment as defined in claim 10, wherein the polyamines and the polyisocyanates are added to the resin and the organic solvent and, thereafter, the pigments are added and dispersed.

15. A method of preparing a resin composition containing a dispersed pigment as defined in claim 10, wherein the polyamines are selected from the group consisting of ethylene diamine, 1,3-propylenediamine, hexamethylenediamine, diethylenetriamine, triethylene tetramine, tetraethylene pentamine, pentaethylene hexamine, bisaminopropyl piperidine, bisaminopyridine, xylylenediamine, metaphenylenediamine, 4,4'-diaminodiphenyl methane and polyethyleneimine.

16. A method of preparing a resin composition containing a dispersed pigment as defined in claim 10, wherein the polyamines are selected from the group consisting of diethylenetriamine, triethylene tetramine, tetraethylene pentamine, pentaethylene hexamine, polyethyleneimine, bisaminopropyl piperidine and bisaminopyridine.

* * * * *